(12) United States Patent
Pasternack (10) Patent No.: US 11,704,312 B2
(45) Date of Patent: Jul. 18, 2023

(54) CONJUNCTIVE FILTERING WITH EMBEDDING MODELS

(71) Applicant: Microsoft Technology Licensing, LLC, Redmond, WA (US)

(72) Inventor: Jeffrey William Pasternack, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/406,303

(22) Filed: Aug. 19, 2021

(65) Prior Publication Data
US 2023/0055429 A1 Feb. 23, 2023

(51) Int. Cl.
*G06F 16/2453* (2019.01)
*G06F 16/2455* (2019.01)

(52) U.S. Cl.
CPC .... *G06F 16/24534* (2019.01); *G06F 16/2455* (2019.01)

(58) Field of Classification Search
CPC .............. G06F 16/24534; G06F 16/2455
USPC ........................................... 707/765
See application file for complete search history.

(56) References Cited

U.S. PATENT DOCUMENTS

| | | | | |
|---|---|---|---|---|
| 6,055,496 A * | 4/2000 | Heidari | ............... | G10L 19/12 704/219 |
| 6,564,212 B2 * | 5/2003 | Koskas | ............. | G06F 16/24534 707/765 |
| 6,853,998 B2 * | 2/2005 | Biebesheimer | ... | G06F 16/24578 707/999.005 |
| 6,931,373 B1 * | 8/2005 | Bhaskar | .................. | G10L 19/08 704/219 |
| 6,996,523 B1 * | 2/2006 | Bhaskar | ................ | G10L 19/097 704/219 |
| 7,013,269 B1 * | 3/2006 | Bhaskar | ................ | G10L 19/097 704/219 |
| 7,246,124 B2 * | 7/2007 | Koskas | ................. | G06F 16/284 707/999.1 |

(Continued)

OTHER PUBLICATIONS

Huang, et al., "Embedding-based Retrieval in Facebook Search", In Proceedings of the 26th ACM SiGKDD International Conference on Knowledge Discovery & Data Mining, Aug. 23, 2020, pp. 2553-2561.

*Primary Examiner* — Hanh B Thai
(74) *Attorney, Agent, or Firm* — Schwegman, Lundberg & Woessner, P.A.

(57) ABSTRACT

Described herein is a technique to facilitate conjunctive filtering for an embedding-based information retrieval system. Each item in a content collection is initially analyzed to identify its property values for some set of properties. For each item, its property values are encoded in the form of a vector, and concatenated with an item embedding for the item to derive an enhanced item embedding. When a query is received, a query embedding is generated. Any filtering parameters received with or as part of the query are encoded in the form of a vector, and the vector is concatenated with the query embedding to derive an enhanced query embedding. The enhanced query embedding is then used in a "k" approximate nearest neighbor search to identify items relevant to the query and having property values that satisfy the filtering parameters.

17 Claims, 5 Drawing Sheets

(56) References Cited

U.S. PATENT DOCUMENTS

| | | | | |
|---|---|---|---|---|
| 7,359,565 B2* | 4/2008 | Ratakonda | H04N 19/42 | 382/254 |
| 7,630,986 B1* | 12/2009 | Herz | G06Q 30/0603 | 707/999.009 |
| 8,478,775 B2* | 7/2013 | Netz | G06F 16/221 | 707/769 |
| 9,467,473 B2* | 10/2016 | Jayaraman | H04L 63/20 | |
| 10,754,851 B2* | 8/2020 | Cohen | G06N 3/042 | |
| 11,182,433 B1* | 11/2021 | Sisto | G06F 16/90332 | |
| 11,386,885 B2* | 7/2022 | Chatterjee | G06N 3/08 | |
| 2004/0030548 A1* | 2/2004 | El-Maleh | G10L 19/002 | 704/E19.022 |
| 2008/0263072 A1* | 10/2008 | Koskas | G06F 16/284 | |
| 2008/0275904 A1* | 11/2008 | Breebaart | G06F 16/634 | 707/999.102 |
| 2010/0030778 A1* | 2/2010 | Liu | G06V 30/40 | 707/765 |
| 2010/0088315 A1* | 4/2010 | Netz | G06F 16/24561 | 707/E17.014 |
| 2010/0098345 A1* | 4/2010 | Andersson | H04N 19/80 | 382/238 |
| 2011/0026599 A1* | 2/2011 | Andersson | H04N 19/176 | 375/E7.125 |
| 2011/0224913 A1* | 9/2011 | Cui | G16B 20/00 | 702/19 |
| 2011/0276592 A1* | 11/2011 | Gautama | G06F 16/29 | 707/769 |
| 2012/0242852 A1* | 9/2012 | Hayward | H04N 23/62 | 345/589 |
| 2015/0066946 A1* | 3/2015 | Fuller | G06F 16/24 | 707/741 |
| 2015/0082370 A1* | 3/2015 | Jayaraman | H04L 63/20 | 726/1 |
| 2017/0039483 A1* | 2/2017 | Cheng | G06N 5/04 | |
| 2019/0188295 A1* | 6/2019 | Sirotkovic | G06F 16/2425 | |
| 2019/0197154 A1* | 6/2019 | Cohen | G06F 16/583 | |
| 2020/0125563 A1* | 4/2020 | Fan | H04L 9/0894 | |
| 2020/0314127 A1* | 10/2020 | Wilson | H04L 43/16 | |
| 2020/0356579 A1* | 11/2020 | Anderson | G06F 16/3338 | |
| 2021/0056095 A1* | 2/2021 | Srivastava | G06F 16/2379 | |
| 2021/0133190 A1* | 5/2021 | Voelker | G06N 3/063 | |
| 2021/0256966 A1* | 8/2021 | Chatterjee | G06N 3/04 | |
| 2021/0294781 A1* | 9/2021 | Fernández | G10L 15/063 | |
| 2021/0294828 A1* | 9/2021 | Tomkins | G06N 3/04 | |
| 2021/0294829 A1* | 9/2021 | Bender | G06F 40/30 | |
| 2021/0294970 A1* | 9/2021 | Bender | G06F 16/2237 | |
| 2021/0295822 A1* | 9/2021 | Tomkins | G16H 70/60 | |
| 2021/0342399 A1* | 11/2021 | Sisto | G06N 3/04 | |
| 2022/0004571 A1* | 1/2022 | Ganapathy | G06F 16/3326 | |
| 2022/0005463 A1* | 1/2022 | Bender | G06F 9/547 | |
| 2022/0164548 A1* | 5/2022 | Tumuluri | G06F 3/167 | |

* cited by examiner

"K" APPROXIMATE NEAREST NEIGHBOR SEARCH
ALGORITHM (USING THE INNER PRODUCT AS A
SIMILARITY METRIC)

{4, 8, 8, 5, ... 2, 0, 0, c}       {4, 7, 9, 4, ... 2, 0, 0, 1}

ENHANCED ITEM EMBEDDING 206      ENHANCED QUERY EMBEDDING 310

INNER PRODUCT $(4*4) + (8*7) + (8*9) + (5*5) + \ldots (2*2) + (0*0) + (0*0) + (c*1)$

CONJUNCTIVE FILTERING WITH EMBEDDING MODELS

TECHNICAL FIELD

The present application generally relates to information retrieval systems. More specifically, the present application relates to a technique to facilitate conjunctive filtering during candidate retrieval by an information retrieval system that utilizes embedding models.

BACKGROUND

Information retrieval systems are implemented in a variety of ways and integrated with a wide variety of applications and services. For instance, information retrieval systems are implemented to provide search services, but are also used to obtain relevant information in other applications and services. By way of example, online dating websites utilize information retrieval systems to provide users with the ability to search for information relating to desirable people. Similarly, online social networking services use information retrieval systems to enable searching for information relating to other users and in many instances, to obtain and present user-generated content within a personalized data feed, sometimes referred to as a news feed, or simply a feed. Online job hosting services use information retrieval services to allow users to search for online job postings. Similarly, e-commerce sites utilize information retrieval systems to provide users with the ability to search for product listings. These are just a few of the many applications and services that utilize information retrieval systems.

In the specific context of search, an information retrieval process typically begins when a user enters a query, which is a formal expression of the user's information needs. In many instances, the query may be a free text query for which the user specifies a combination of words, terms, or phrases to express the user's information needs. The information retrieval system processes the query against a collection of data or information to identify individual instances of information satisfying the query. In this context, the individual instances of data are frequently referred to as documents, but might also be referred to as data objects, or simply, items. For purposes of the present disclosure, the term "item" is used to reference the individual instances of data that make up the collective information repository or content collection that is accessed by an information retrieval system. For example, in the context of an e-commerce site, an item may be a product listing, whereas, in the context of a dating service or online social networking service, an item may be a user profile. Similarly, in the context of an online job hosting service, the items accessed via an information retrieval system may be online job postings.

In the realm of information retrieval systems, conjunctive filtering provides for the retrieval of items that satisfy filtering parameters. For example, in addition to specifying a query, in many instances, a user may specify various filtering parameters that relate to specific properties of the items in the content collection. Filters are typically conjunctions of acceptable sets of multinomial values for the various properties of the items to be retrieved. For instance, in the context of a search engine for searching user profiles of persons registered with an online service, a search may be subject to a filter specifying that the user profiles of interest are those associated with persons who 1) have a particular job title (e.g., "Software Engineer" or "Statistician"), 2) reside within a particular geographical location (e.g., "San Jose, Calif." or "the San Francisco, Bay Area"), and 3) have a specific degree (e.g., "Computer Science") from a particular educational institution (e.g., "State University" or "Top Ten University"). The specific manner in which a conjunctive filtering feature is implemented will generally depend on a variety of factors relating to the information retrieval system and the specific application or service. However, in almost all instances, one requirement of any such filtering mechanism is that it be strictly applied. That is, when a user specifies one or more filtering parameters, the items retrieved and presented to a user by the information retrieval system must have property values that are consistent with any filtering parameters specified by the user. For this reason, filters of this nature may be referred to as "hard" filters.

BRIEF DESCRIPTION OF THE DRAWINGS

Embodiments of the present invention are illustrated by way of example and not limitation in the figures of the accompanying drawings, in which.

DETAILED DESCRIPTION

Described herein are methods and systems for facilitating a conjunctive filtering feature for use with an information retrieval system that utilizes an embedding-based candidate retrieval stage. In the following description, for purposes of explanation, numerous specific details and features are set forth to provide a thorough understanding of the various aspects of different embodiments of the present invention. It will be evident, however, to one skilled in the art, that the present invention may be practiced and/or implemented with varying combinations of the many details and features presented herein.

Many information retrieval systems are designed to process information in two separate stages—candidate retrieval and ranking. The first stage involves what is commonly referred to as candidate retrieval, when a query, which is a formal expression of a user's information needs, is used to identify items within a collection of such items. The items identified as a result of processing the query are often referred to as candidates, or candidate items, in as much as some of the items may be more or less relevant than others with respect to the information needs of the user. Accordingly, during the second stage of the information retrieval process, the candidate items identified during the candidate retrieval stage are scored using a ranking algorithm. Finally, some number of the highest-ranking of the items are presented in a user interface, ordered based on their ranking scores. For example, the items with the highest ranking scores are typically presented in the most prominent position.

Historically, the candidate retrieval stage has been implemented utilizing what are commonly referred to as term or token-based matching techniques. With term or token-based matching, during the candidate retrieval stage, words or terms expressed in the query are compared with or matched against the text of the individual items to identify potentially relevant candidate items. When the total number of items in the collection is relatively small, term or token-based matching may involve full text searching, where the entire text of each item is scanned for query terms when processing a query. However, when the volume of items in the collection is high, the text of each item may be pre-scanned to generate one or more search indices. For instance, during an indexing stage, which occurs prior to processing a query, the entire text of each item is scanned to build a list of search terms called a search index. A search index, specifically an inverted index or reverse index, maps terms present in the collection of items to the specific items in which those terms are present. Processing a query using one or more search indices can significantly improve the speed and efficiency of retrieving relevant candidate items, at the expense of the extra time and processing initially needed to generate the search indices.

Information retrieval systems that utilize term or token-based matching techniques at the candidate retrieval stage have proven particularly useful. However, term or token-based matching techniques have shortcomings. It is often the situation that words have more than one meaning, and concepts may be expressed with combinations of different words. When candidate retrieval is based on term or token-based matching techniques, there is a possibility of returning items with text that satisfies a query, but the meaning of the text does not satisfy the information needs of the user. Similarly, different terms are often used to express the same or a similar concept. As a result, some highly relevant items in the data collection may not be identified during the candidate retrieval stage as these items may include text that collectively expresses a concept relevant to a user's information needs, but do not include within the text the specific terms or words expressed in a user-specified search query.

More recently, information retrieval systems have been developed with candidate retrieval techniques that utilize what are referred to as semantic matching techniques. In the context of information retrieval systems, semantic matching techniques typically involve a concept known as representation learning, and more precisely, embeddings. An embedding is an encoding of the meaning of some raw data (e.g., text) into a real-valued vector, so that the vector representations of individual instances of the raw data will be similar, and thus close together in distance in the embedding space when the individual instances of raw data have a similar meaning. To use embeddings in the context of an information retrieval system, a learned vector representation (e.g., an embedding) is derived for each item in the collection of items, using a first embedding model. For ease of reference, the embedding derived for an item will be referred to herein as an item embedding. A second embedding model is trained to derive learned vector representations of queries (e.g., query embeddings) that are mapped to the item embedding space. Then, at inference time (e.g., when a user's query is being processed), a user's query is processed by the second, pre-trained embedding model to derive a learned vector representation of the user-specified query—referred to herein as a query embedding. The query embedding, corresponding with the user-specified query, is then used in a similarity search to identify item embeddings in the item embedding space that are similar to the query embedding. For example, the query embedding may be used as an input to a "k" approximate nearest neighbor ("k-ANN") algorithm to identify some number of items having item embeddings that are similar to the query embedding. Information retrieval systems that utilize embeddings in this manner may be referred to as embedding-based information retrieval systems.

Embedding-based information retrieval systems provide a significant advantage over those that utilize term or token-based matching, in that embedding-based retrieval systems allow for the retrieval of items from a content collection based on semantic matching of the query, without relying on an exact word match as is required with term or token-based matching techniques. Furthermore, some implementations of the k-ANN algorithm utilize similarity scoring functions to assess the similarity of the query and item embeddings that are highly efficient in terms of their computational expense and have excellent recall or retrieval time performance. By way of example, some implementations of k-ANN algorithms implement similarity scoring functions that are based on techniques that utilize proximity graphs, with each item represented in the proximity graph being connected with other items that have a similar vector representation. In this context, a similarity search is processed by a walk in the proximity graph, which keeps moving towards items that are the most similar to the query embedding. Many of these proximity graph techniques use the inner product of the respective query and item embeddings as the similarity metric to both construct the proximity graph and to execute the search for items.

However, one significant problem that arises from using embedding-based information retrieval systems at the candidate retrieval stage is that embedding-based retrieval systems do not support the ability to filter items at the candidate retrieval stage. For example, because the vector representations of the query and items are lower dimensional representations, the similarity scoring techniques used with embedding-based information retrieval systems do not provide the level of precision required to guaranty that items will, or will not, have certain property values satisfying filtering parameters specified by a user. Attempting to improve the accuracy of the learned embedding models to support the strict requirements of conjunctive filtering necessarily increases the overall complexity of the embedding models, tends to increase the parameter space of the embedding models, and increases the amount of data needed to train the embedding models. Furthermore, even with such efforts to improve the embedding models, the selection of appropriate items based on filtering parameters cannot be guaranteed at the candidate retrieval stage. Some items having property values that do not satisfy the user-specified filtering parameters would likely still be retrieved.

Because conjunctive filtering is not natively supported within the existing framework and architechture of many embedding-based information retrieval systems, a variety of alternative solutions have been developed. Many of these alternative solutions support conjunctive filtering through reliance on complex "hybrid" systems that combine the use of k-ANN algorithms with inverted indices, and/or less efficient similarity scoring models that utilize techniques such as product quantization. These hybrid solutions significantly increase the complexity of an information retrieval system, making such a system more expensive to engineer, develop and maintain. For instance, the inverted indices used in some of these hybrid systems require additional memory storage and effort to build, rebuild, and maintain, and the inference latency and computational cost suffer significantly because less-efficient implementations of k-ANN algorithms must be used, including those that implement similarity scoring techniques using product quantization.

Consistent with embodiments of the present invention, conjunctive filtering is implemented as part of the candidate retrieval stage of an embedding-based retrieval system in a systematic way, so that candidate items satisfying filtering parameters are identified and retrieved as part of the similarity scoring process during the execution of the k-ANN algorithm. Consistent with some embodiments of the invention, each item in a content collection is processed with a property encoder to encode the relevant property values of the item into a vector representation. The vector representation of the property values of a given item is then concatenated with the item embedding of the item to derive what is referred to herein as an enhanced item embedding. Similarly, when a search query is received for processing, the search query is processed using a pre-trained embedding model to generate for the search query a vector representation of the query, referred to herein as a query embedding. Additionally, any filtering parameters received with or as part of the query are processed by a filtering parameter encoder to generate a vector representation of the filtering parameters. The vector representation of the filtering parameters is concatenated with the query embedding for the query to derive what is referred to herein as an enhanced query embedding. Accordingly, as the term is used herein, an enhanced item embedding is a vector representation of an item having a first component that has been generated by an embedding model and is representative of the item generally, and a second component that is specifically representative of the various properties and corresponding property values associated with the item, as generated by a property encoder. Similarly, an enhanced query embedding is a vector representation of a query having a first component representing the query itself, and a second component representing specific filtering parameters received with, or derived from, the query.

Consistent with embodiments of the present invention and described in greater detail below, the encoding of the property values of each item and the encoding of the filtering parameters received with or as part of the query are done in accordance with a particular encoding scheme such that, the similarity scoring model used during the execution of the k-ANN algorithm provides a scoring boost to those items having property values that satisfy the filtering parameters associated with a given query, without otherwise impacting the relative ranking of the items. As such, the items that are associated with similarity scores that have been boosted by some known amount as a result of the encoded filtering parameters and property values, will be the items having the highest similarity scores. By way of example, with some embodiments, the similarity scoring model of the k-ANN algorithm uses as a similarity metric the inner product of the enhanced vectors representing the query and the item. The encoding of the filtering parameters and the property values is done in such a manner that, when the inner product is calculated for an enhanced query embedding and an enhanced item embedding, the portions of the vectors encoding the filtering parameters and property values cause the resulting value of the inner product calculation for the vector pair to be significantly increased by some known amount if the property values of the item satisfy and correspond with the filtering parameters. Consequently, those items having property values that satisfy the filtering parameters corresponding with a given query will have a significantly increased similarity score, resulting from the calculation of the inner product, over those items that do not have property values satisfying the filtering parameters. As such, the objective of guaranteeing that the hard filtering requirement is satisfied is achieved in an extremely efficient manner via the similarity scoring model used with the k-ANN algorithm. The inventive technique described herein therefore eliminates the need for maintaining one or more conventional search indices and/or implementing a similarity scoring algorithm that relies on product quantizing, as are often found in more complex hybrid systems that utilize embedding-based information retrieval techniques.

Another advantage of the present invention stems from encoding the items and the query as vectors. Specifically, because the similarity search is performed on data encoded as vectors, the processing of the data can be done efficiently with specific hardware that implements an instruction set that leverages what is known as, Single Instruction Multiple Data (SIMD) processing. SIMD is a type of parallel processing that is capable of performing a single operation over a large set of data, with a single instruction. For example, using SIMD, when calculating a dot product of two vectors, the individual elements of the two vectors can be loaded into memory in parallel, such that a single data operation can be performed on multiple elements of each vector in parallel, thereby significantly reducing the number of operations required to calculate the dot product. Accordingly, using SIMD, the various vector operations associated with the similarity search can be performed more efficiently, increasing the overall speed of the system. Other aspects and advantages of the present inventive concept will be readily apparent from the description of the figures that follow.

Figure 1:
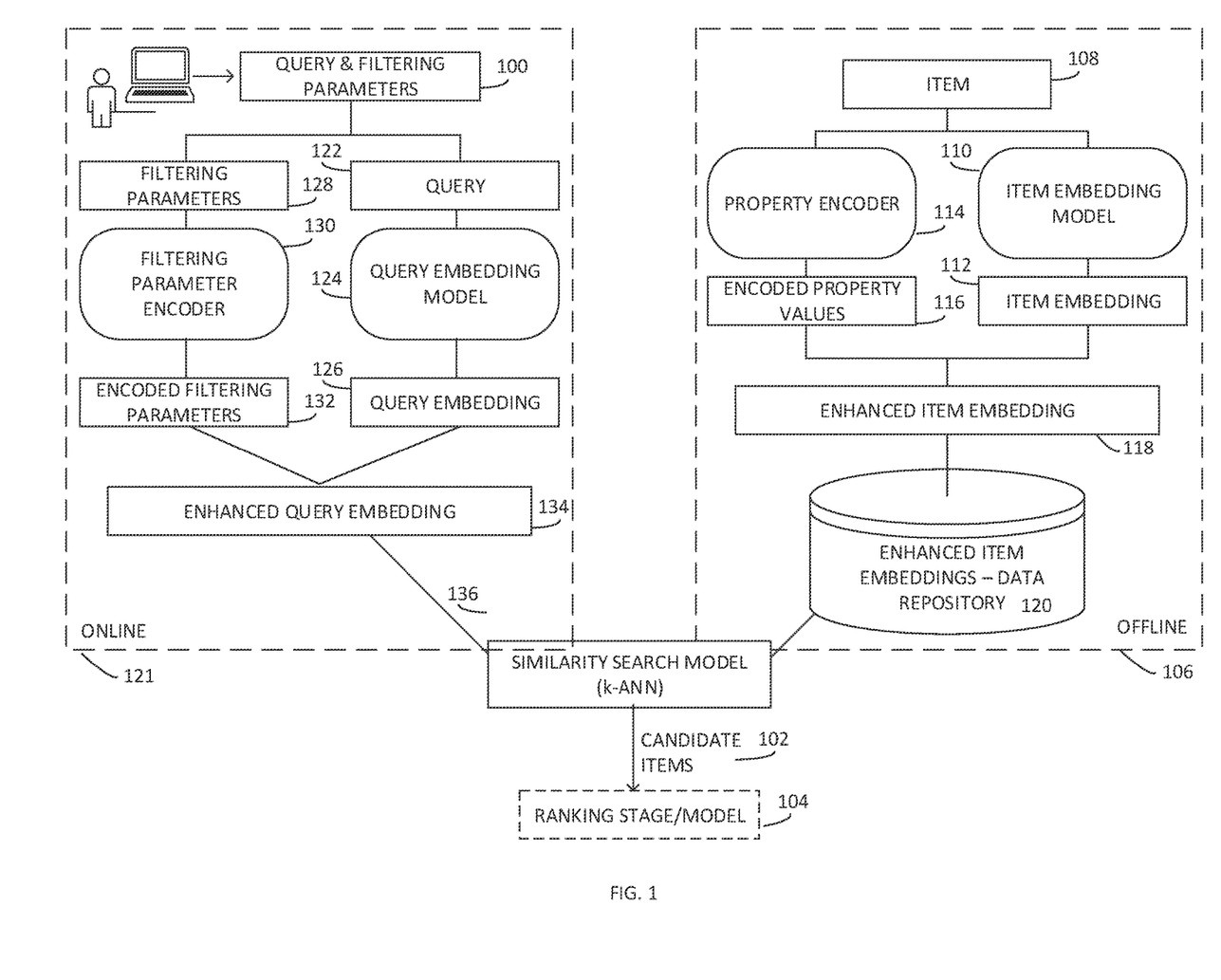
FIG. 1 is a system diagram illustrating an example of the various system components that comprise an embedding-based information retrieval system, consistent with some embodiments of the present invention.

FIG. 1 is a system diagram illustrating an example of the various system components that comprise part of an embedding-based information retrieval system consistent with some embodiments of the present invention. As shown in FIG. 1, the part of the embedding-based information retrieval system illustrated is that portion of the system that generates or identifies the candidate items during the candidate retrieval stage. Accordingly, the input to the portion of the system illustrated in FIG. 1 is a query and one or more filtering parameters 100, as may be specified by a user. The output of the portion of the system illustrated in FIG. 1 is a set of candidate items 102 having property values that satisfy the filtering parameters. As shown in FIG. 1 and as will be readily appreciated by those skilled in the art, the candidate items 102 that are identified as a result of the candidate retrieval stage may be provided as inputs to another component 104 that performs a ranking process for the items, the details of which are beyond the scope of the present invention and disclosure.

With various implementations, the query and the filtering parameters may be obtained in a variety of different ways. For example, in some instances, a user interface presented to a user may provide a text input box at which a user is prompted to input text that is used to form the search query. The user interface may have various graphical user interface (GUI) elements that enable a user to select or otherwise specify various filtering parameters. In other instances, the search query entered or provided by a user may be processed to determine a filtering parameter from the text of the search query itself. In yet other instances, a filtering parameter may be specified as part of a user profile or may be system generated. For example, a specific system configuration setting and/or some user preference specified by a user in a user profile may be used as a filtering parameter. As a general matter, the specific manner by which the query and filtering parameters are specified by a user or the system, and obtained by the embedding-based information retrieval system, are beyond the scope of the inventive subject matter.

The embedding-based information retrieval system operates in two stages. As indicated by the dashed bounding box 106 in the right portion of FIG. 1, the first stage is characterized as an offline stage during which pre-processing of the searchable items in the data repository occurs. The operations that occur during this offline stage are necessary to prepare the data for processing during the online stage, also referred to as inference time, when a user's query is processed. During the offline stage, each item 108 is read from a data repository and is processed by an item embedding model 110 to derive an item embedding 112 for the item in an item embedding space. An item embedding 112 is a vector representation of the item 108 that is derived by the item embedding model 110 so that similar items are represented by vectors that are similar to one another, and thus, close in distance to one another, within the item embedding space. A variety of techniques—both supervised and unsupervised—may be used to train the item embedding model 110 and to derive the item embeddings for the items.

In addition to processing each item to generate an item embedding, each item 108 is processed with a property encoder 114 to derive for the item a vector representation of the various property values associated with the item. For example, the property encoder 114 processes and/or analyzes all of the data associated with and making up the item to determine its relevant property values, and then encodes those property values in the form of a vector, such that the values of the various elements in the vector indicate the specific property values of the item. An example of a specific technique for encoding the property values of items is described below in connection with the descriptions of FIGS. 2, 3 and 4. In FIG. 1, the vector representation of the property values is shown, with reference number 116, as encoded property values. Then, the item embedding 112 that is representative of the item 108 is concatenated with the encoded property values 116 that are representative of the specific property values of the item, resulting in an enhanced item embedding 118 for the item. This process is completed initially for each item in a data repository or content collection, and then, each time a new item is added to the data repository. The result of the offline process is a data repository 120 storing, for each item in the data repository, an enhanced item embedding for the item.

Turning now to the left portion of FIG. 1, during the online stage 121, the system receives a query and one or more filtering parameters 100 from a computing device of a user. The query 122 is processed by a pre-trained query embedding model 124 to derive for the query 122 a query embedding 126. The filtering parameters 128 are processed by a filter encoder 130 to generate a vector representation of the filtering parameters, shown in FIG. 2 as encoded filtering parameters, with reference number 132. The vector representation of the filtering parameters 132 is then concatenated with the query embedding 126, resulting in an enhanced query embedding 134.

The enhanced query embedding 134 is then used as an input to a similarity search model 136 in order to identify candidate items 102 in the data repository 120 that are relevant to the query 122 and having property values that satisfy the filtering parameters 128. Consistent with some embodiments, the similarity search algorithm implemented by the similarity search model 136 may be a particular implementation of a k-ANN algorithm that operates on vectors and relies on or uses as a similarity scoring metric an inner product of the enhanced query embedding and an enhanced item embedding. Accordingly, at least with some embodiments, as a result of the encoding of property values of an item and the encoding of the filtering parameters that are concatenated with the query embedding, the inner product calculation results in a boost to the similarity score of those items having property values that satisfy the filtering parameters.

A specific example of an encoding scheme is described below in connection with the description of FIGS. 2, 3 and 4. One skilled in the art will readily recognize that the encoding scheme described below is one example. In various alternative embodiments, other encoding schemes may be implemented. Of particular importance is that the encoding scheme for encoding the filtering parameters and item properties be implemented in a manner that makes it possible to identify those items having property values that satisfy any filtering parameters, as a result of whatever similarity scoring algorithm is used to measure the similarity between a query embedding and an item embedding. For example, consistent with the encoding scheme described below, the similarity metric used in the scoring algorithm for determining the similarity of query and item embeddings is the inner product. Consequently, when the vector representation of the property values of an item and the vector representation of the one or more filtering parameters are derived in accordance with the encoding scheme described herein, the value resulting from the calculation of the inner product of the enhanced query embedding and the enhanced item embedding increases by some multiple of a predetermined fixed value when the property values of an item satisfy the one or more filtering parameters received with the query, as compared to the value resulting from the calculation of the inner product of the query embedding and the item embedding. As such, vector representations of the property values and the filtering parameters gives a boost to the similarity score calculated for an enhanced query embedding and an enhanced item embedding, when the property values of the item satisfy the filtering parameters. In other implementations of the inventive subject matter described herein, other similarity metrics (e.g., Cosine or Euclidian distance) may be used. However, the specific encoding scheme for the property values and filtering parameters would need to be adjusted to operate properly in connection with whatever similarity metric is used.

Consistent with some embodiments, as part of an encoding scheme, the property values for each property for which filtering is allowed are encoded as a vector having one less element than possible property values for the specific property. For instance, assume for a particular implementation that P is the set of properties on which filtering will be allowed, and $p \in P$ is a specific property taking $|p|$ possible values. The total number of distinct property values across all properties is $n = \Sigma_{p \in P} |p|$. Accordingly, for an implementation with one-hundred trinary properties (e.g., a property that has three possible property values), the total number of possible property values, n, is three hundred. Consistent with some embodiments and in accordance with one particular encoding scheme, the dimensionality of both the original query and item embeddings will increase by n−|P| each. For example, in an implementation with one-hundred trinary properties, both the query and item embeddings will each have two-hundred additional dimensions or vector elements. For both the enhanced query and the enhanced item embeddings, each property p can thus be assigned |p|−1 corresponding dimensions, the ordering of which are irrelevant so long as they are consistent.

Each item embedding that corresponds with a specific item in the content collection or data repository is supplemented to capture the property values of the properties, P, for that item, by concatenating the original item embedding with a vector representation for each property in the set of properties. For a given property, p, the vector representation for the property will have |p|−1 dimensions. With p representing a property, each property value for the property is assigned an ordinal number, which may be expressed as an index, i, having a value from one to |p|, with $p_i$ being the index of the value of the property exhibited by an item. When $p_i \le |p|-1$, the $p_i$'th element in the vector representation is set to an arbitrarily large, predetermined, constant value, c, with all other elements set to zero. When $p_i=|p|$, all elements in the vector are set to the negative of the predetermined, constant value, e.g., −c. Accordingly, for a quadrinary property (e.g., a property having four possible property values), the vector representations are as follows, If the property value for the item corresponds with property value #1: {0, 0, c}
If the property value for the item corresponds with property value #2: {0, c, 0}
If the property value for the item corresponds with property value #3: {c, 0, 0}
If the property value for the item corresponds with property value #4: {−c, −c, −c}

By way of example, consider a scenario in which each item has a single property, color, and each item is associated with one of four different colors—red, blue, yellow, and green. The vector representation for the property, color, will add three dimensions to the item embedding of an item. For instance, the vector encoding the color of an item would have three elements. The position in the vector of an element corresponds with an ordinal number assigned to the property value, in accordance with the encoding scheme. For example, if the color, red, is assigned the ordinal number, one, then the first element in the vector, when set to the specific predetermined constant value, c, indicates that the property value for that property, for the particular item, is the color, red. Accordingly, consistent with the example encoding scheme, a vector such as, "{0, 0, c}" may be used to encode the property value, red, for the property, color. Similarly, if the color, blue, is assigned the ordinal number, two, in the encoding scheme, then the vector representation of the property value that corresponds with the color, blue, may be expressed as, "{0, c, 0}." When a property value is assigned an ordinal number that is equal to the total number of possible property values for the property (e.g., when $p_i=|p|$), then the vector representation for that property value is established by setting all elements in the vector to the negative of the fixed value, e.g., −c. For example, if the color, green, is assigned the ordinal number four, then the vector representation for the color, green, may be expressed as, "{−c, −c, −c}."

Figure 2:
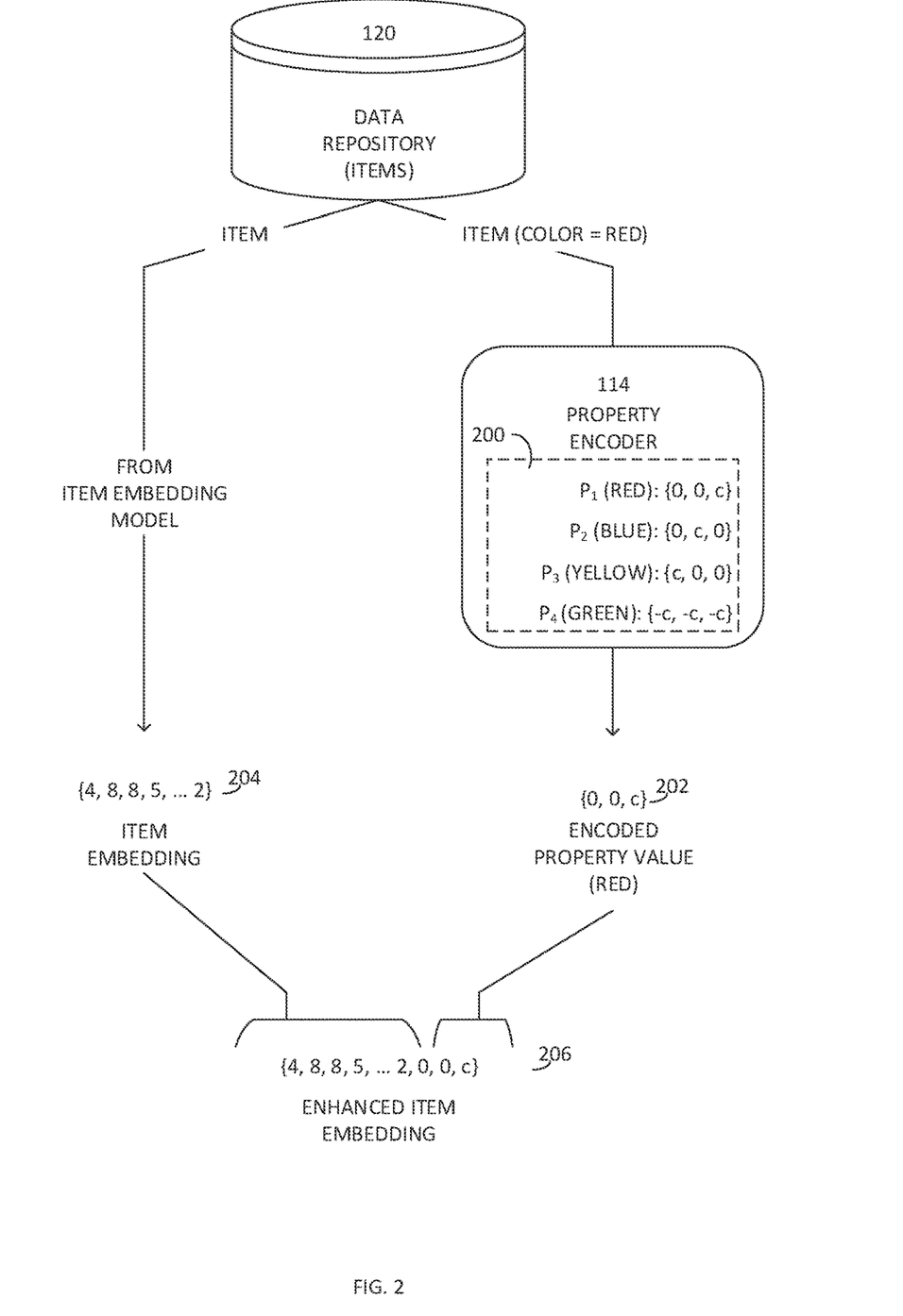
FIG. 2 is a diagram illustrating an example of how property values of an item are encoded as a vector representation in accordance with one encoding scheme, consistent with some embodiments of the invention.

FIG. 2 is a diagram illustrating an example of how property values of an item are encoded as a vector representation in accordance with an encoding scheme consistent with some embodiments of the invention. For purposes of the simplified example illustrated in FIG. 2, only a single property, "color," is shown. Those skilled in the art will readily appreciate that in various implementations, any number of additional properties, having any number of property values, may be encoded in a manner consistent with the encoding scheme described and illustrated. When the encoding scheme is applied to items with multiple properties, the encoding of each property is simply concatenated to form a single vector representation of all of the property values, for all properties. As illustrated in FIG. 2, the property encoder 114 obtains data associated with an item stored in the item repository 120. The property encoder 114 determines the property value of the item. For example, the property encoder 114 may compare a particular data element of the item with a list of expected or known property values to determine whether the item has or exhibits a value consistent with a property value consistent with one designated as part of the encoding scheme. In this example, the item is associated with only a single property (e.g., color), and the item exhibits the property value, red, for the property.

As illustrated in the dashed bounding box with reference number 200, an encoding scheme 200 for encoding the property value associated with the property, color, is shown. In this example, because the item exhibits the property value, red, the property for the item is encoded to indicate the property value with a vector expressed as, {0, 0, c}, as red is the first (e.g., ordinal number, one) property value for the property. This encoded property value 202 is then concatenated with the item embedding 204 for the item to derive the enhanced item embedding 206. The dimensionality of the item embedding may vary from one embodiment to the next, and as such, for purposes of this example, only a portion of the item embedding is illustrated in FIG. 2. The enhanced item embedding 206 is then stored in association with the item in the data repository 120. This process is repeated for all items in the data repository and when any new item is added to the item repository.

While each item embedding is supplemented with the property values of the item, the query embedding is supplemented to capture the values of the properties that are acceptable based on the filtering parameters. Using q as an index to reference the set of property values, p, that are acceptable based on the filtering parameters, the vector representation of the filtering parameters can be derived as follows.

If $p_q$ contains all possible values for p, such that $|p_q|=|p|$, then this property is not filtered (e.g., any value for the property is acceptable) and the vector representation is all zeros. Because each element in the vector is a zero, the vector representation of the property will not contribute to (e.g., increase or decrease) the similarity score.

If $p_q$ contains a proper subset of the possible values of the property, not including the property value with index |p|, the vector representation of the filtering parameter corresponding with the specific property is a multi-hot vector where each element in the vector corresponding with a property value that is present is set to one, and set to zero otherwise.

If $p_q$ contains a proper subset of the possible values of the property, including the property value with index |p|, then there is at least one value with index <|p| that is not acceptable to the filter. In this case, one of the index values that corresponds with a property value that is not acceptable to the filter is chosen arbitrarily, and its index is referenced as r. The vector representation is then constructed as follows:

For each value included in $p_q$ with an index value <|p|, the corresponding vector element is set to one.

For the vector element at the position that corresponds with the index value, r, the vector element is assigned the value $-p_q$.

All other elements are then set to zero.

Figure 3:
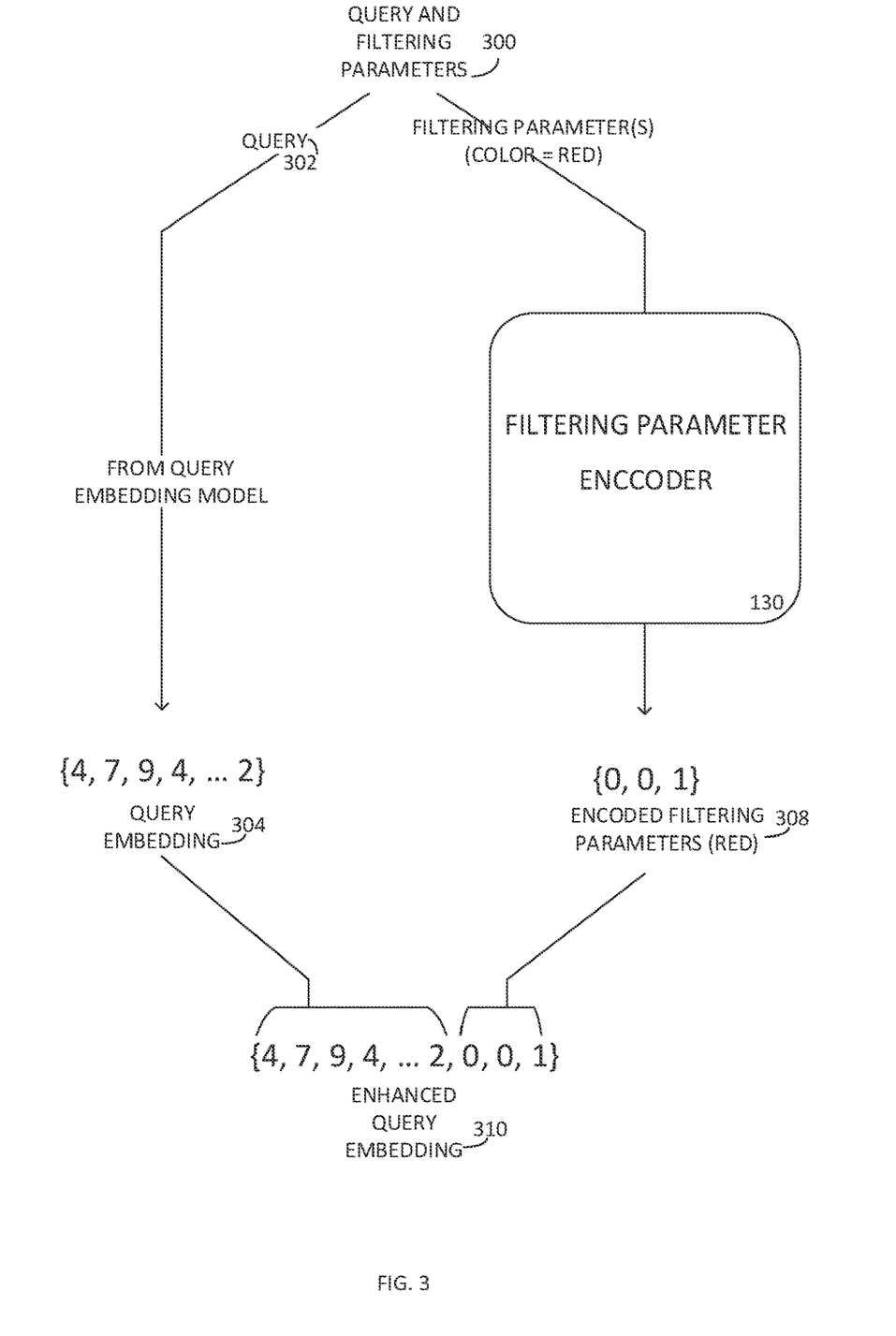
FIG. 3 is a diagram illustrating an example of how filtering parameters received with or as part of a query are encoded as a vector representation, in accordance with one encoding scheme consistent with embodiments of the invention.

FIG. 3 is a diagram illustrating an example of how filtering parameters received with or as part of a query are encoded as a vector representation, in accordance with one example encoding scheme, consistent with embodiments of the invention. As illustrated in FIG. 3 with reference number 300, a query and filtering parameters are initially received. The query 302 is processed by an embedding model to derive for the query 302 a query embedding 304. The filtering parameters are processed by a filtering parameter encoder 130 to generate a vector representation 308 of the filtering parameter. Continuing with the simplified example presented above, the example encoding scheme involves a single property for the color of an item. Accordingly, in the example presented in FIG. 3, the filtering parameter received with the query indicates that acceptable items are those items exhibiting the property value, red. The filtering parameter encoder 130 receives the filtering parameter, determines the acceptable property value (e.g., red) and encodes the acceptable property value as a vector representation 308. As the color, red, is assigned the ordinal number, one, in the example encoding scheme, the vector representation for the filtering parameter in this example is constructed by setting the first element of the vector to the number, one, while setting all other elements to zero. This vector representation of the filtering parameter is presented in FIG. 3 with reference number 308. This vector representation 308 of the filtering parameter is then concatenated with the query embedding 304, to derive an enhanced query embedding 310.

Consistent with the example encoding scheme described above, had the filtering parameter specified that the color, yellow, was the only acceptable color, the vector representation of the filtering parameter would have been constructed differently, expressed as follows, {1, 0, 0}. For example, as the property value, yellow, is associated with the ordinal number three in the encoding scheme, the vector element that corresponds with position three is set to one when the color, yellow, is the only acceptable property value. Similarly, if the filtering parameter had indicated more than one color is acceptable, such as the colors, green and blue, then the vector representation of the filtering parameter might be expressed as, {0, 1, $-p_q$}.

As described and illustrated below, by encoding the property values of an item and the filtering parameters received with a query in the manner described, during the k-ANN search, any item having the color, red, as a property value, will exhibit an increase in its similarity score as a result of calculating the inner product of the enhanced embeddings. Specifically, the calculation of the inner product for the enhanced query embedding and an enhanced item embedding associated with an item exhibiting property values that satisfy the filtering parameters will be increased by the predetermined constant value, c.

Figure 4:
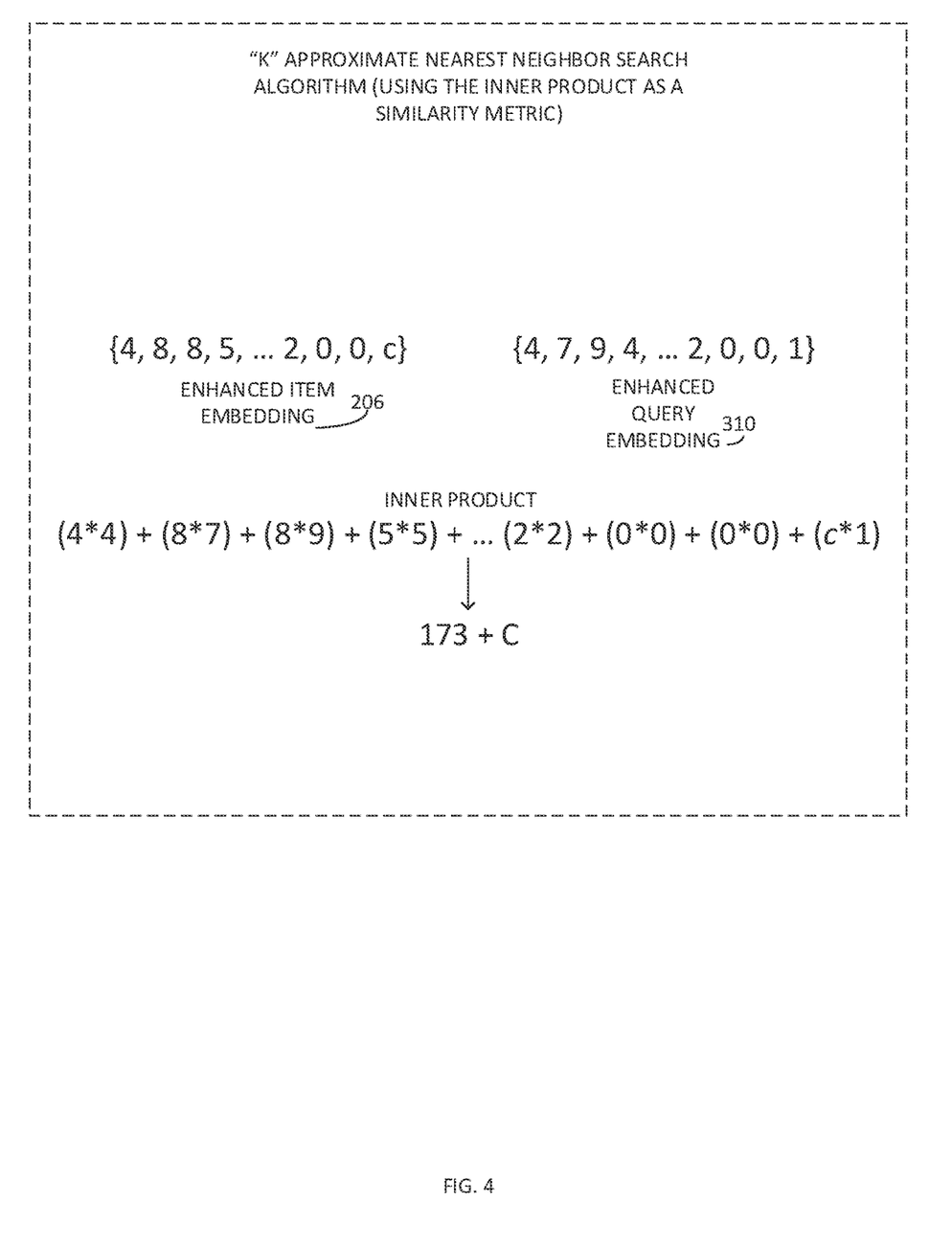
FIG. 4 is a diagram illustrating an example of how a similarity scoring model scores items by calculating an inner product of an enhanced query embedding and an enhanced item embedding, consistent with embodiments of the invention.

FIG. 4 is a diagram illustrating an example of how a similarity scoring model scores items by calculating an inner product of an enhanced query embedding and an enhanced item embedding, consistent with embodiments of the invention. As shown in FIG. 4, consistent with some embodiments of the invention, the enhanced query embedding 310 is used as an input to a "k" approximate nearest neighbor search. With some embodiments, the k-ANN algorithm is implemented to use as a similarity metric the calculation of the inner product for the enhanced query embedding and each enhanced item embedding. As shown in FIG. 4, the inner product of two vectors is simply the sum of the product of each element in the same position within the respective vectors. In the example presented in FIG. 4, the resulting value of the inner product calculation for the enhanced item embedding 206 and the enhanced query embedding 310 is expressed as, "173+c," where "c" is the predetermined, constant value, selected for use as part of the encoding scheme. In this particular example, the portion of the score represented by, c, results from the fact that the filtering parameter has been encoded as, {0, 0, 1} and the property value, red, for the property, color, has been encoded as {0, 0, c}. As such, the inner product of this portion of the respective vectors is the value, c. Any item that does not have the property value, red, would have a final score that is at least c less than the highest score.

Consequently, in this example, the increase in the calculation of the value for the inner product of the enhanced vectors, relative to the embeddings (e.g., prior to concatenating the encoding of property values and filtering parameters), is the predetermined fixed value, c. More generally, the increase to the score of any item satisfying the filter will be equal to the number of properties actually filtered (e.g., those for which at least one possible value is acceptable) multiplied by the predetermined fixed value, c. Conversely, the final score for items not satisfying the filter will be equal or less than the inner product of the original query and item embeddings, ensuring that they will always rank below the satisfying items (whose scores will be boosted by at least c).

Consistent with some embodiments, the predetermined fixed value, c, used in accordance with the example encoding scheme, is selected to be arbitrarily large. Specifically, the value of c is chosen, such that c is greater than the highest inner product of any of the original query and item embeddings, and thus, any item having property values satisfying the filter will have a higher score than all items that do not satisfy the filter, and because all items satisfying the filter have their scores "boosted" by the same amount their relative rankings do not change. While it is possible that a k-ANN search may return non-satisfying items when there are fewer than "k" items that satisfy the filtering parameters, this is easily remedied by simply performing a check of each returned item to ensure that its property values satisfy the filtering parameters.

Figure 5:
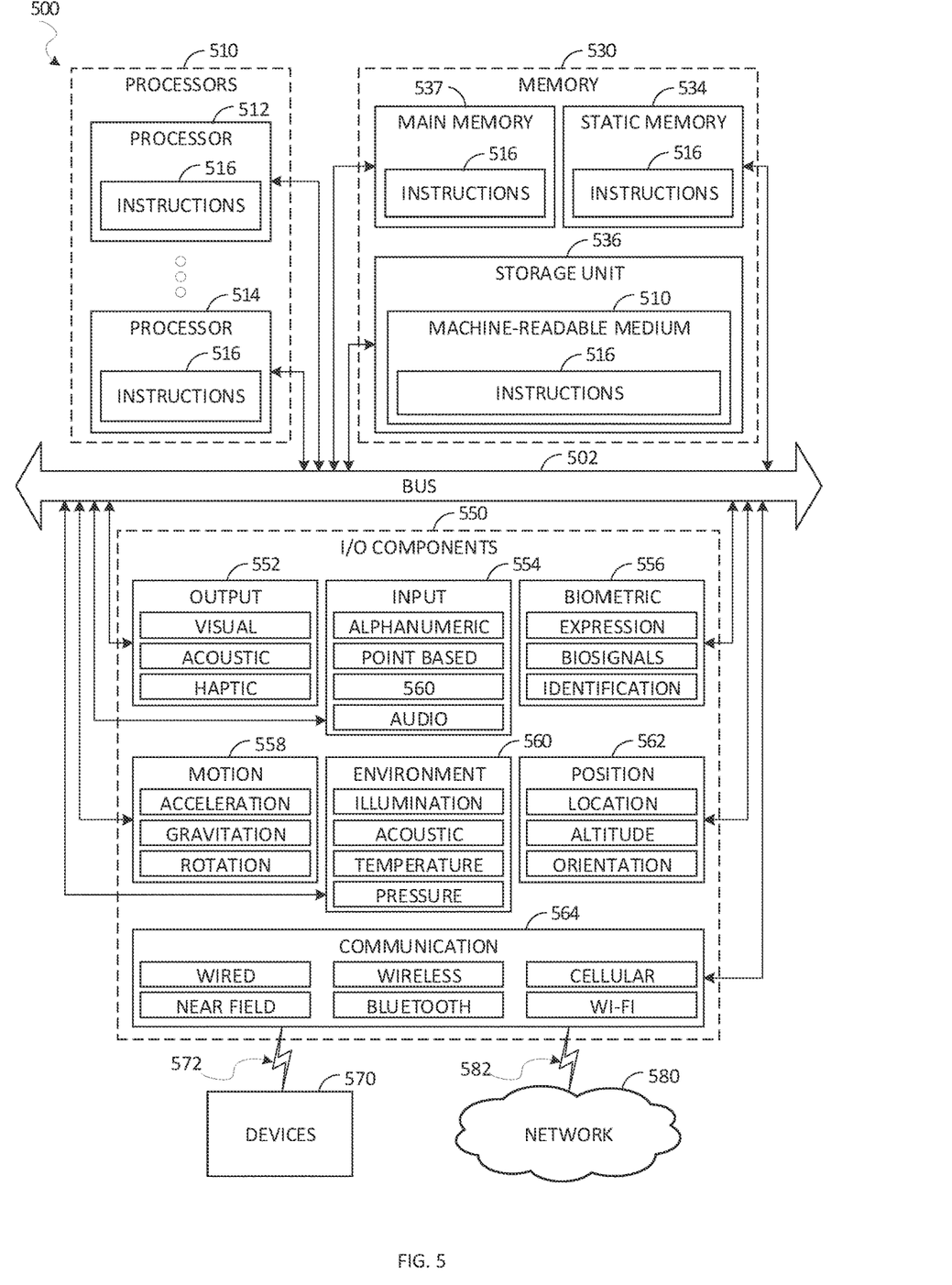
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions 516 may cause the machine 500 to execute any one of the methods described in connection with the description of the figures. Additionally, or alternatively, the instructions 516 may implement the systems described and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiples cores, or any combination thereof.

The memory 530 may include a main memory 532, a static memory 534, and a storage unit 536, all accessible to the processors 510 such as via the bus 502. The main memory 530, the static memory 534, and storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or storage unit 536 may store one or more sets of instructions and data structures (e.g., software) embodying or utilized by any one or more of the methodologies or functions described herein. These instructions (e.g., the instructions 516), when executed by processor(s) 510, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

What is claimed is:

1. A computer-implemented method comprising:
   for each item in a set of items in a data repository, deriving for the item an enhanced item embedding by i) determining property values of the item, ii) deriving a vector representation of the property values of the item, iii) deriving an item embedding for the item and iv) enhancing the item embedding by concatenating the item embedding with the vector representation of the property values of the item;
   receiving a query and one or more filtering parameters; and
   processing the query and the one or more filtering parameters by i) deriving a query embedding for the query, ii) deriving a vector representation of the one or more filtering parameters, iii) concatenating the query embedding with the vector representation of the one or more filtering parameters to derive an enhanced query embedding, and iv) performing a "k" approximate nearest neighbor search to identify "k" items in the data repository having property values satisfying the one or more filtering parameters;
   wherein, in accordance with an encoding scheme for the set of items in the data repository, the value resulting from calculating the inner product of the enhanced query embedding and the enhanced item embedding of an item increases by a multiple of a predetermined fixed value "c" when the property values of an item satisfy the one or more filtering parameters received with the query, as compared to the value resulting from the calculation of the inner product of the query embedding and the item embedding.

2. The computer-implemented method of claim 1, wherein the "k" approximate nearest neighbor search is implemented to use the inner product of the enhanced query embedding and the enhanced item embedding for each item as a similarity metric for identifying the "k" items in the data repository having property values satisfying the one or more filtering parameters.

3. The computer-implemented method of claim 1, further comprising:
subsequent to performing the "k" approximate nearest neighbor search to identify "k" items in the data repository having property values satisfying the one or more filtering parameters, performing a verification operation on at least one item embedding to verify that the property values of the at least one item satisfy the one or more filtering parameters.

4. The computer-implemented method of claim 1, wherein, in accordance with the encoding scheme, the predetermined fixed value "c" is selected to be greater than the value of the inner product of an enhanced query embedding and any enhanced item embedding for an item in the set of items in the data repository.

5. The computer-implemented method of claim 1, wherein, in accordance with the encoding scheme, for each property of a plurality of properties of an item, each property value of a property is assigned an ordinal number from one to "p" with "p" being equal to the total number of possible property values for the property, and deriving a vector representation of the property values of an item comprises:
for each property of the plurality of properties of the item:
generating for the property a vector with a number of elements that is one less than "p";
when the property value for the property corresponds with a property value having an ordinal number less than "p" according to the encoding scheme, setting the element of the vector in the position that corresponds with the ordinal number of the property value to the predetermined fixed value ("c") and setting all other elements of the vector to zero ("0");
when the property value for the property corresponds with the property value having the ordinal number that is equal to "p" according to the encoding scheme, setting each element of the vector to the negative predetermined fixed value ("-c"); and
concatenating the vector generated for each property of the plurality of properties of the item to derive the vector representation of the property values of the item.

6. The computer-implemented method of claim 1, wherein, in accordance with the encoding scheme, deriving a vector representation of the filtering parameters comprises:
for each filtering parameter of the one or more filtering parameters corresponding with a property of the plurality of properties of an item:
generating for the filtering parameter a vector with a number of elements that is one less than "p" for the property with which the filtering parameter corresponds;
processing the filtering parameter to determine property values for the property that satisfy the filtering parameter;
when items having any property value for the property satisfy the filtering parameter, setting each element in the vector to a value of zero;
when items having a subset of property values for the property satisfy the filtering parameter and the property value having an ordinal number equal to "p" for the property is excluded from the subset, setting to one any element in the vector having a position that corresponds with an ordinal number of a property value of a property satisfying the filtering parameter, and setting to zero any element in the vector having a position that corresponds with an ordinal number of a property value of a property not satisfying the filtering parameter;
when items having a subset of property values for the property satisfy the filtering parameter and the property value having an ordinal number equal to "p" for the property is included in the subset, setting to one any element in the vector having a position that corresponds with an ordinal number of a property value that satisfies the filtering parameter, setting to a negative value one element in the vector having a position that corresponds with an ordinal number of a property value of a property that does not satisfy the filtering parameter, and setting to zero all other elements in the vector; and
concatenating the vector generated for each filtering parameter of the one or more filtering parameters to derive the vector representation of the filtering parameters.

7. An information retrieval system comprising:
at least one processor for executing instructions;
at least one memory storage device storing instructions, which, when executed by the at least one processor, cause the information retrieval system to perform operations comprising:
for each item in a set of items in a data repository, derive for the item an enhanced item embedding by i) determining property values of the item, ii) deriving a vector representation of the property values of the item, iii) deriving an item embedding for the item, and iv) enhancing the item embedding by concatenating the item embedding with the vector representation of the property values of the item;
receive a query and one or more filtering parameters; and
process the query and the one or more filtering parameters by i) deriving a query embedding for the query, ii) deriving a vector representation of the one or more filtering parameters, iii) concatenating the query embedding with the vector representation of the one or more filtering parameters to derive an enhanced query embedding, and iv) performing a "k" approximate nearest neighbor search to identify "k" items in the data repository having property values satisfying the one or more filtering parameters;
wherein, in accordance with an encoding scheme for the set of items in the data repository, the value resulting from calculating the inner product of the enhanced query embedding and the enhanced item embedding of an item increases by a multiple of a predetermined fixed value ("c") when the property values of an item satisfy the one or more filtering parameters received with the query, as compared to the value resulting from the calculation of the inner product of the query embedding and the item embedding.

8. The information retrieval system of claim 7, wherein the "k" approximate nearest neighbor search is implemented to use the inner product of the enhanced query embedding and the enhanced item embedding for each item as a similarity metric for identifying the "k" items in the data repository having property values satisfying the one or more filtering parameters.

9. The information retrieval system of claim 7, wherein the operations further comprise:
subsequent to performing the "k" approximate nearest neighbor search to identify "k" items in the data repository having property values satisfying the one or more filtering parameters, perform a verification operation on at least one item embedding to verify that the property values of the at least one item satisfy the one or more filtering parameters.

10. The information retrieval system of claim 7, wherein, in accordance with the encoding scheme, the predetermined fixed value "c" is selected to be greater than the value of the inner product of an enhanced query embedding and any enhanced item embedding for an item in the set of items in the data repository.

11. The information retrieval system of claim 7, wherein, in accordance with the encoding scheme, for each property of a plurality of properties of an item, each property value of a property is assigned an ordinal number from one to "p" with "p" being equal to the total number of possible property values for the property, and the operation for deriving a vector representation of the property values of an item comprises:

for each property of the plurality of properties of the item:
generating for the property a vector with a number of elements that is one less than "p";
when the property value for the property corresponds with a property value having an ordinal number less than "p" according to the encoding scheme, setting the element of the vector in the position that corresponds with the ordinal number of the property value to the predetermined fixed value ("c") and setting all other elements of the vector to zero ("0");
when the property value for the property corresponds with the property value having the ordinal number that is equal to "p" according to the encoding scheme, setting each element of the vector to the negative predetermined fixed value ("-c"); and
concatenating the vector generated for each property of the plurality of properties of the item to derive the vector representation of the property values of the item.

12. The information retrieval system of claim 7, wherein, in accordance with the encoding scheme, the operation for deriving a vector representation of the filtering parameters comprises:

for each filtering parameter of the one or more filtering parameters corresponding with a property of the plurality of properties of an item:
generating for the filtering parameter a vector with a number of elements that is one less than "p" for the property with which the filtering parameter corresponds;
processing the filtering parameter to determine property values for the property that satisfy the filtering parameter;
when items having any property value for the property satisfy the filtering parameter, setting each element in the vector to a value of zero;
when items having a subset of property values for the property satisfy the filtering parameter and the property value having an ordinal number equal to "p" for the property is excluded from the subset, setting to one any element in the vector having a position that corresponds with an ordinal number of a property value of a property satisfying the filtering parameter, and setting to zero any element in the vector having a position that corresponds with an ordinal number of a property value of a property not satisfying the filtering parameter;
when items having a subset of property values for the property satisfy the filtering parameter and the property value having an ordinal number equal to "p" for the property is included in the subset, setting to one any element in the vector having a position that corresponds with an ordinal number of a property value that satisfies the filtering parameter, setting to a negative value one element in the vector having a position that corresponds with an ordinal number of a property value of a property that does not satisfy the filtering parameter, and setting to zero all other elements in the vector; and
concatenating the vector generated for each filtering parameter of the one or more filtering parameters to derive the vector representation of the filtering parameters.

13. An information retrieval system comprising:
means for deriving, for each item in a set of items in a data repository, an enhanced item embedding for the item by i) determining property values of the item, ii) deriving a vector representation of the property values of the item, iii) deriving an item embedding for the item, and iv) enhancing the item embedding by concatenating the item embedding with the vector representation of the property values of the item;
means for receiving a query and one or more filtering parameters; and
means for processing the query and the one or more filtering parameters by i) deriving a query embedding for the query, ii) deriving a vector representation of the one or more filtering parameters, iii) concatenating the query embedding with the vector representation of the one or more filtering parameters to derive an enhanced query embedding, and iv) performing a "k" approximate nearest neighbor search to identify "k" items in the data repository having property values satisfying the one or more filtering parameters;
wherein, in accordance with an encoding scheme for the set of items in the data repository, the value resulting from calculating the inner product of the enhanced query embedding and the enhanced item embedding of an item increases by a multiple of a predetermined fixed value ("c") when the property values of an item satisfy the one or more filtering parameters received with the query, as compared to the value resulting from the calculation of the inner product of the query embedding and the item embedding.

14. The information retrieval system of claim 13, wherein the "k" approximate nearest neighbor search is implemented to use the inner product of the enhanced query embedding and the enhanced item embedding for each item as a similarity metric for identifying the "k" items in the data repository having property values satisfying the one or more filtering parameters.

15. The information retrieval system of claim 13, further comprising:
means for performing a verification operation on at least one item embedding to verify that the property values of the at least one item satisfy the one or more filtering parameters, subsequent to performing the "k" approximate nearest neighbor search to identify "k" items in the data repository having property values satisfying the one or more filtering parameters.

16. The information retrieval system of claim 13, wherein, in accordance with the encoding scheme, the predetermined fixed value "c" is selected to be greater than the value of the inner product of an enhanced query embedding and any enhanced item embedding for an item in the set of items in the data repository.

17. The information retrieval system of claim 13, wherein, in accordance with the encoding scheme, for each property of a plurality of properties of an item, each property value of a property is assigned an ordinal number from one to "p"

with "p" being equal to the total number of possible property values for the property, and the system further comprise means for deriving a vector representation of the property values of an item by:
- for each property of the plurality of properties of the item: generating for the property a vector with a number of elements that is one less than "p";
- when the property value for the property corresponds with a property value having an ordinal number less than "p" according to the encoding scheme, setting the element of the vector in the position that corresponds with the ordinal number of the property value to the predetermined fixed value ("c") and setting all other elements of the vector to zero ("0");
- when the property value for the property corresponds with the property value having the ordinal number that is equal to "p" according to the encoding scheme, setting each element of the vector to the negative predetermined fixed value ("-c"); and
- concatenating the vector generated for each property of the plurality of properties of the item to derive the vector representation of the property values of the item.

* * * * *